United States Patent
Jain et al.

(10) Patent No.: US 11,286,807 B2
(45) Date of Patent: Mar. 29, 2022

(54) METALLIC COMPLIANT TIP FAN BLADE

(71) Applicant: General Electric Company, Schenectady, NY (US)

(72) Inventors: Nitesh Jain, Bangalore (IN); Abhijit Roy, Bangalore (IN); Kishore Budumuru, Bangalore (IN); Nicholas Joseph Kray, Mason, OH (US)

(73) Assignee: General Electric Company, Schenectady, NY (US)

( * ) Notice: Subject to any disclaimer, the term of this patent is extended or adjusted under 35 U.S.C. 154(b) by 46 days.

(21) Appl. No.: 16/145,656

(22) Filed: Sep. 28, 2018

(65) Prior Publication Data

US 2020/0102852 A1 Apr. 2, 2020

(51) Int. Cl.
*F01D 21/04* (2006.01)
*F01D 5/14* (2006.01)

(52) U.S. Cl.
CPC ........... *F01D 21/045* (2013.01); *F01D 5/147* (2013.01); *F05D 2230/239* (2013.01); *F05D 2240/307* (2013.01)

(58) Field of Classification Search
CPC .......... F01D 5/28; F01D 21/045; F01D 21/04; F01D 5/147; F05D 2240/307; B64C 11/20; F04D 29/388
USPC ..................................................... 416/241 R
See application file for complete search history.

(56) References Cited

U.S. PATENT DOCUMENTS

| | | | |
|---|---|---|---|
| 5,232,344 A | 8/1993 | El-Aini | |
| 5,490,764 A * | 2/1996 | Schilling | F01D 5/288 |
| | | | 416/239 |
| 5,634,771 A | 6/1997 | Howard et al. | |
| 5,947,688 A | 9/1999 | Schilling et al. | |
| 6,033,186 A | 3/2000 | Schilling et al. | |
| 6,039,542 A | 3/2000 | Schilling et al. | |
| 6,491,497 B1 * | 12/2002 | Allmon | F01D 21/045 |
| | | | 384/495 |

(Continued)

FOREIGN PATENT DOCUMENTS

| | | |
|---|---|---|
| CN | 1637246 | 7/2005 |
| CN | 101718227 | 6/2010 |

(Continued)

OTHER PUBLICATIONS

Chinese Patent Office, "First Office Action and Search Report," issued in connection with Chinese Patent Application No. 201910922839.3, dated Jul. 17, 2020, 19 pages. English translation included.

(Continued)

*Primary Examiner* — Courtney D Heinle
*Assistant Examiner* — Andrew Thanh Bui
(74) *Attorney, Agent, or Firm* — Hanley, Flight & Zimmerman, LLC

(57) ABSTRACT

A blade for a propulsion apparatus that includes a body formed of a first material having opposed pressure and suction sides, and extending in span between a root and a boundary, and extending in chord between a leading edge and a trailing edge. A tip region that is formed of a second material and that is positioned such that it extends from the body and defines a tip. The tip region joins the body at the boundary. The tip region is configured to fail when a predetermined force is applied to the tip such that the tip separates from the blade and defines a fused tip.

19 Claims, 4 Drawing Sheets

(56) References Cited

U.S. PATENT DOCUMENTS

| | | | |
|---|---|---|---|
| 6,913,839 B2* | 7/2005 | Darolia | C23C 28/02 |
| | | | 428/615 |
| 7,114,912 B2 | 10/2006 | Gerez et al. | |
| 7,780,410 B2* | 8/2010 | Kray | B23P 15/04 |
| | | | 415/9 |
| 7,780,420 B1 | 8/2010 | Matheny | |
| 8,083,489 B2 | 12/2011 | Viens et al. | |
| 8,142,165 B2* | 3/2012 | Beckford | F01D 5/147 |
| | | | 416/229 A |
| 8,585,368 B2 | 11/2013 | Viens et al. | |
| 8,821,124 B2 | 9/2014 | Viens et al. | |
| 8,840,361 B2* | 9/2014 | Bottome | F01D 5/14 |
| | | | 415/9 |
| 8,845,283 B2* | 9/2014 | Cairo | F04D 29/164 |
| | | | 415/173.3 |
| 9,003,657 B2 | 4/2015 | Bunker et al. | |
| 9,021,696 B2 | 5/2015 | Jakimov et al. | |
| 9,085,989 B2* | 7/2015 | Shah | F01D 5/282 |
| 9,133,712 B2 | 9/2015 | Fisk et al. | |
| 9,175,568 B2 | 11/2015 | Ryan et al. | |
| 9,260,784 B2 | 2/2016 | Jakimov et al. | |
| 9,850,767 B2 | 12/2017 | Guo et al. | |
| 9,879,559 B2 | 1/2018 | Fisk et al. | |
| 9,926,794 B2 | 3/2018 | Strock | |
| 2011/0211965 A1 | 9/2011 | Deal et al. | |
| 2014/0050589 A1 | 2/2014 | Viens et al. | |
| 2015/0064019 A1 | 3/2015 | Lacy et al. | |
| 2015/0204347 A1 | 7/2015 | Strock et al. | |
| 2015/0321289 A1 | 11/2015 | Bruck et al. | |
| 2015/0322800 A1 | 11/2015 | Crosatti et al. | |
| 2015/0337671 A1 | 11/2015 | Strock et al. | |
| 2015/0369046 A1* | 12/2015 | Roberge | F04D 29/321 |
| | | | 60/805 |
| 2016/0003083 A1 | 1/2016 | Delisle et al. | |
| 2016/0053625 A1 | 2/2016 | Fisk et al. | |
| 2016/0069184 A1 | 3/2016 | Ribic et al. | |
| 2016/0245110 A1 | 8/2016 | Strock et al. | |
| 2018/0171802 A1 | 6/2018 | Lacy et al. | |
| 2019/0277156 A1 | 9/2019 | Negri et al. | |

FOREIGN PATENT DOCUMENTS

| | | |
|---|---|---|
| CN | 101864993 | 10/2010 |
| CN | 102287401 | 12/2011 |
| CN | 103089317 | 5/2013 |
| CN | 106536089 | 3/2017 |
| EP | 2243929 | 10/2010 |
| GB | 2327467 | 1/1999 |
| JP | 2000087897 | 3/2000 |

OTHER PUBLICATIONS

Chinese Patent Office, "First Office Action and Search Report," issued in connection with Chinese Patent Application No. 201910922856.7, dated Jul. 17, 2020, 17 pages. English abstract included.

United States Patent and Trademark Office, "Non-Final Office Action," issued in connection with U.S. Appl. No. 16/145,759, dated Apr. 13, 2020, 12 pages.

* cited by examiner

METALLIC COMPLIANT TIP FAN BLADE

BACKGROUND OF THE INVENTION

This invention relates to turbofan blades and turbofan containment casings. More specifically it relates to fan blades which are compliant or fusible at their tips in order to prevent damage to a surrounding casing.

A gas turbine engine includes a turbomachinery core having a high-pressure compressor, a combustor, and a high-pressure turbine in a serial flow relationship. The core is operable in a known manner to generate a primary flow of propulsive gas. A typical turbofan engine adds a low-pressure turbine driven by the core exhaust gases which in turn drives a fan rotor through a shaft to generate a bypass flow of propulsive gas. In the case of a high bypass engine this provides the majority of the total engine thrust.

The fan rotor includes a fan that includes an array of fan blades extending radially outward from a fan disk. The fan blades are positioned radially inward of a shroud and are configured to clear the shroud during normal operating conditions. However, during operation of the engine, a fragment of a fan blade may contact the shroud and fail. As a result, a substantial rotary unbalance load may be created.

Such a rotary unbalance will cause substantial fan gyrations. Such fan gyrations can cause significant damage to the engine. Conventionally, damaging fan gyrations were accommodated by use of a containment structure that included trench filler. Conventionally, such trench filler can be about 2 to 3 inches thick and formed of a metallic honeycomb. One problem with this solution is that trench filler is heavy and can cause engine inefficiencies.

BRIEF DESCRIPTION OF THE INVENTION

This problem is addressed by providing a turbofan engine that includes a fan blade configured to fail in a limited manner, more specifically the fan blade is configured such that the tip separates from the body of the fan blade quickly upon contact with a shroud.

According to one aspect, a blade for a propulsion apparatus that includes a body formed of a first material having opposed pressure and suction sides, and extending in span between a root and a boundary, and extending in chord between a leading edge and a trailing edge. A tip region that is formed of a second material and that is positioned such that it extends from the body and defines a tip. The tip region joins the body at the boundary. The tip region is configured to fail when a predetermined force is applied to the tip such that the tip separates from the blade and defines a fused tip.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
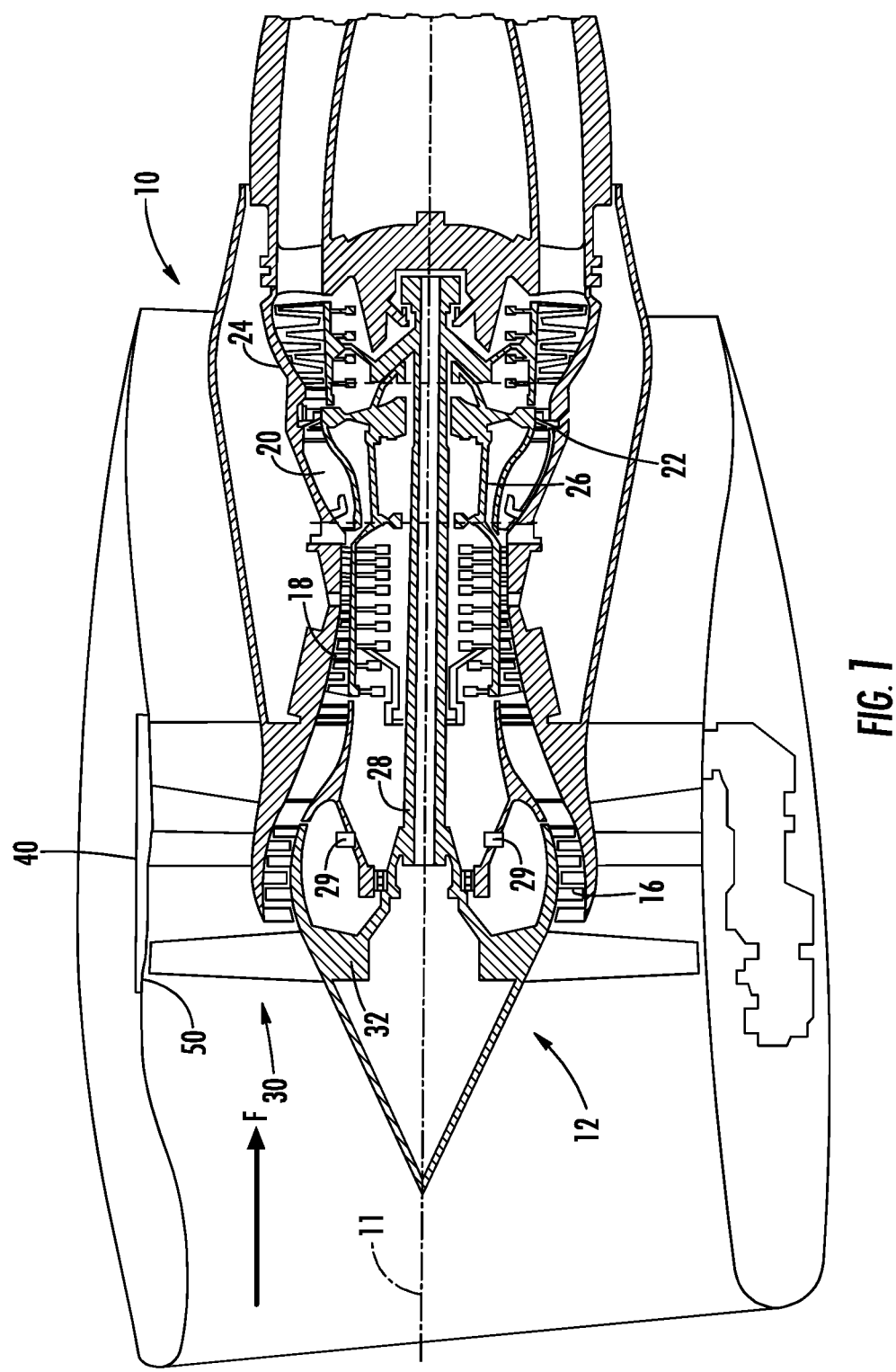
FIG. 1 is a schematic cross-sectional view of a gas turbine engine.

Referring to the drawings wherein identical reference numerals denote the same elements throughout the various views, FIG. 1 depicts an exemplary gas turbine engine 10 that includes a propulsion apparatus. While the illustrated example is a high-bypass turbofan engine, the principles of the present invention are also applicable to other types of engines, such as low-bypass turbofans, turbojets, turboprops, etc. The engine 10 has a longitudinal center line or axis 11. As used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

The engine 10 has a fan 12, booster 16, compressor 18, combustor 20, high pressure turbine or "HPT" 22, and low-pressure turbine or "LPT" 24 arranged in serial flow relationship. In operation, pressurized air from the compressor 18 is mixed with fuel in the combustor 20 and ignited, thereby generating combustion gases. Some work is extracted from these gases by the high-pressure turbine 22 which drives the compressor 18 via an outer shaft 26. The combustion gases then flow into the low-pressure turbine 24, which drives the fan 12 and booster 16 via an inner shaft 28.

The fan 12 is one example of a propulsion apparatus. It will be understood that the principles described herein are applicable to other kinds of propulsion apparatus operable to produce propulsive thrust, such as ducted propellers or compressors. Instead of a gas turbine engine, the fan 12 or other propulsion apparatus could be driven by another type of prime mover such as: heat engines, motors (e.g. electric, hydraulic, or pneumatic), or combinations thereof (for example electric hybrid drivetrains). The propulsion apparatus may be driven directly by a prime mover, or through an intermediate geartrain.

A plurality of mechanical fuses 29 are positioned mechanically between the fan 12 and the shaft 28. The mechanical fuses 29 are configured to transfer rotational energy from the shaft 28 during normal operation. High radial forces may cause a mechanical fuse 29 to fail thus allowing the fan 12 to rotate about a new axis of rotation. The mechanical fuse 29 is referred to as a load reduction device, or LRD.

Figure 2:
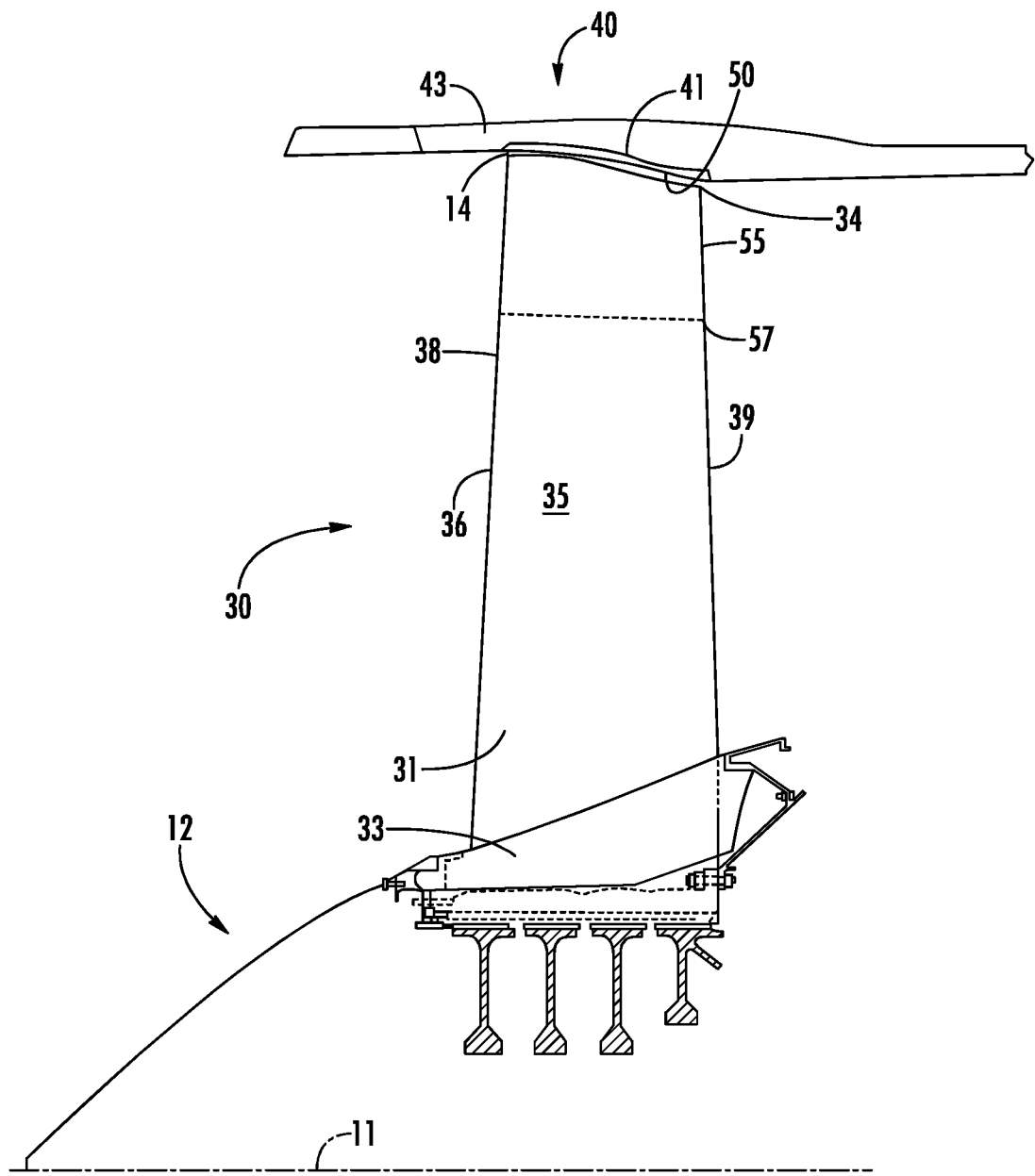
FIG. 2 is an enlarged view of a portion of the gas turbine engine of FIG. 1, showing a fan blade and a portion of a fan hub and shroud.

Referring to FIG. 2, fan 12 includes a plurality of fan blades 30. The fan blades 30 are mounted to a fan disk 32 (shown in FIG. 1) extends from a root 33 to a tip 34 and defines a length L (shown in FIG. 3). The root 33 is defined by a body 31 and the tip 34 is defined by a tip region 55. The body 31 and the tip region 55 are joined to each other and thus define a boundary 57. Additionally, each fan blade 30 includes a pressure side 35, a suction side 36, a leading edge 38 and a trailing edge 39.

Figure 7:
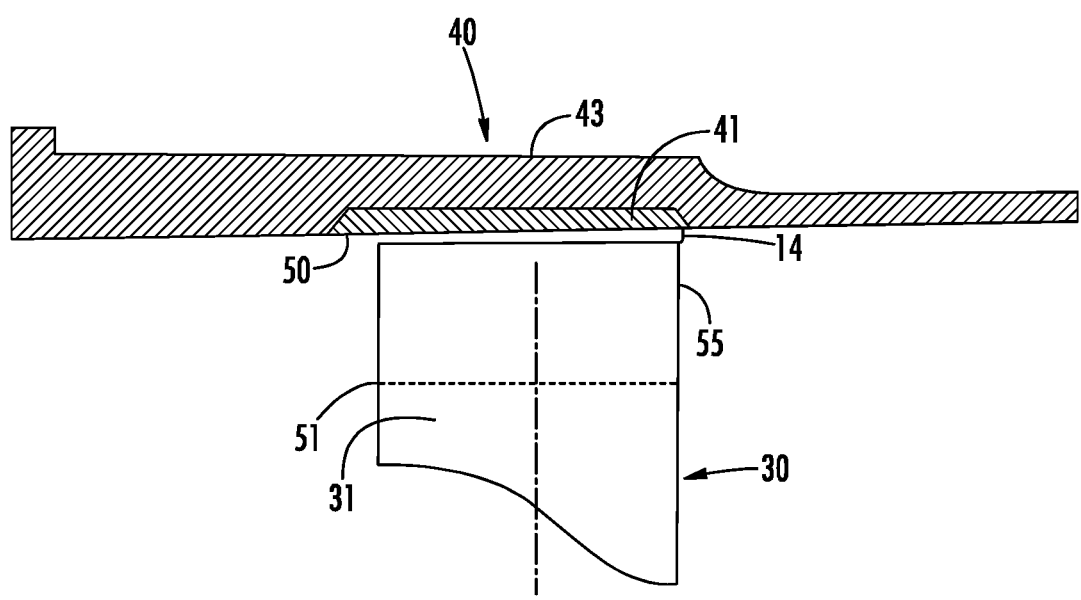
FIG. 7 is a sectional view of a portion of the fan blade showing its relative position to a portion of a shroud.

As shown in FIG. 7, the fan casing 40 includes an inner annular surface 50. The inner annular surface 50 has a generally circular cross-section and defines an inner diameter of the inner casing 40. The inner annular surface 50 is configured to channel the incoming air through the fan 12 (FIG. 1) so as to ensure that the fan 12 (FIG. 1) will compress the bulk of the air entering the engine 10. By way of example and not limitation, the fan casing 40 can be made of the following: a metal, a composite material, and a combination thereof.

As shown in FIG. 7, the inner casing 40 includes a thin layer of shroud material 41 positioned adjacent to a blade tip path defined by the blades 30 of the fan 12. The shroud material 41 is supported by a containment structure 43. According to the illustrated embodiment, the containment structure 43 is generally solid and is not configured as a honeycomb structure or as other trench filler material such as that found in conventional fan casing 40 does not include trench filler. Instead the casing 40 consists essentially of a solid metal containment structure 43 and the shroud material 41.

A small radial gap 14 is present between the tips 34 of the fan blades 30 and the inner annular surface 50. It is this clearance, i.e., the radial gap 14, that is minimized in order to promote the efficiency of the engine 10.

Figure 3:
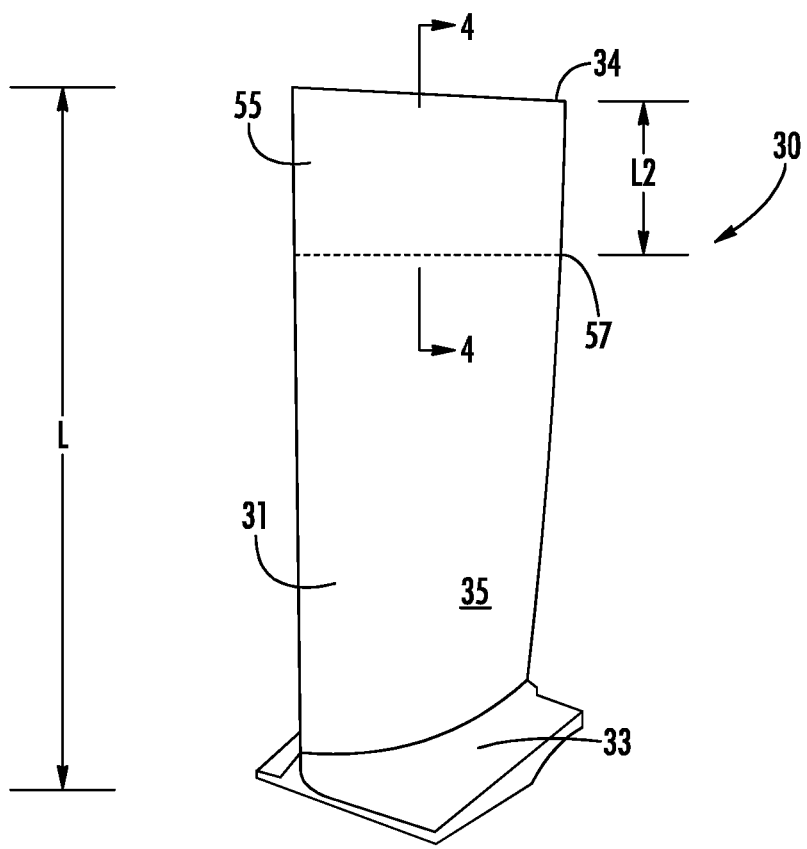
FIG. 3 is a perspective view of a fan blade according to the present invention.
Figure 4:
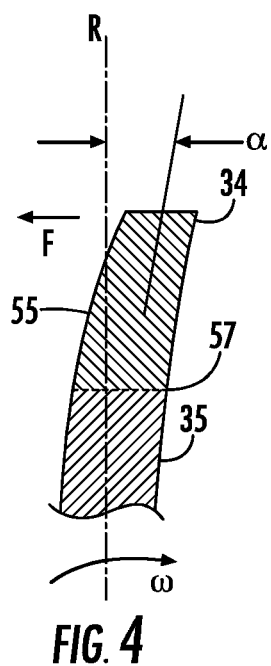
FIG. 4 is a sectional view of a portion of the fan blade of FIG. 3 taken at line 4-4.

As shown in FIG. 3, the tip region 55 has a length L2 and preferably begins less than 85% of a total length L of the blade 30 away from the root 33. Stated another way, the length L2 of the tip region 55 is less than 15% of the length L of the blade 30. The boundary 57 can be positioned closer to the blade tip 34 such that it is further away from the root 33 than 85% of the total length L of the blade 30. Optionally the tip region 55 begins about 90% of the total length L of the blade 30 away from the root 33. The tip region 55 continues from the boundary 57 to the blade tip 34. The tip region 55 is formed of a second material that is different than the first material that forms the body 31 of the blade 30. The second material can be a metal. The second material is weaker than the first material.

Referring now to FIGS. 3-6, the tip region 55 of the blade 30 is configured to fail such that the tip 34 is detached if contact occurs between annular surface 50 and one of tips 34. Failure of the tip region 55 results in a tip region remnant 62 that is attached to the body 31. The tip region remnant 62 has a length L3 and defines a fused tip 64. In other words, the blade 30 is configured to be compliant and fail in a limited manner such that further catastrophic contact will not occur if the radial gap 14 is not maintained. The tip region 55 is configured to fail between the boundary 57 and the tip 34. In this regard, the tip region 55 is oriented such that when the tip region 55 fails, the tip 34 of the blade 30 folds across the body 31 of the blade 30 along the chord between the boundary 57 and the tip 34. Preferably the tip 34 folds parallel to the chord but in other embodiments, the tip 34 does not fold parallel to the chord but folds sufficient to clear the inner annular surface 50.

The tip region 55 is configured such that the tip region 55 does not fail in light rub conditions like crosswinds or under medium flocking bird impact. The body 31 of the blade 30 and the tip region 55 are configured such that the blade 30 fails, i.e. fuses, under heavy rub resulting from events like FBO, large bird ingestion, etc.

The blade body 31 is preferably formed of a first material that is a first metal. By way of example, the first metal can be titanium such as Ti64, steel, nickel, cobalt, and alloys thereof. The tip region 55 is preferably formed of a second material that is weaker than the first material. By way of example and not limitation, the tip region 55 can be formed of materials such as Ti17 and Aluminum. By way of example and not limitation, the first material can be titanium (Ti) and the second material can be aluminum (Al). The modulus of titanium is about 1.66E7 psi. Thus the yield of the first material is between about 118 KSI and 130 KSI. The modulus of aluminum is about 1.02E7 psi. Thus the yield of the second material is between about 40 KSI and about 60 KSI.

The illustrated blade 30 can be manufactured using any method of attaching metal to metal. Such methods include additive manufacturing, friction welding, and electrical discharge machining (EDM). An advantage of blades of the illustrated embodiment is that such blades help reduce the overall weight and cost of the fan module of the engine significantly.

Figure 5:
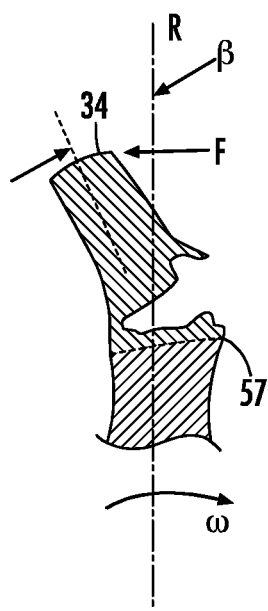
FIG. 5 is a sectional view of a portion of the fan blade of FIG. 3 taken at line 4-4 during a failure mode.
Figure 6:
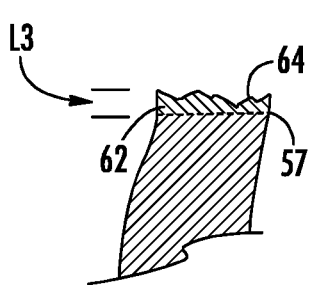
FIG. 6 is a sectional view of a portion of the fan blade of FIG. 3 after failure has occurred.

The present invention can be better understood from a description of the operation thereof. During normal operation, the fan 12 rotates in the forward direction ω. During a failure mode, such as LRD, the tips 34 contact the surface 50 such that force "F" is applied to the tip 34 in the opposite direction to ω. As a result, the tip 34 is deflected away from the original orientation as represented in FIG. 5. When the deflection of the tip 34 reaches a predetermined value, the weaker second material of the tip region 55 fails in a predetermined manner.

By way of example, a typical failure mode occurs when the LRD mechanical fuse 29 fails. As indicated above, the fan 12 rotates about a new axis. The new rotation can cause blades 30 to contact the surface 50. Such contact would initiate fracturing of the tip region 55. A portion of the tip region 55 is detached from the blade 30. The remaining portion of the tip region 55 defines a tip region remnant 62 that is attached to the body 31 at the boundary 57. The tip region remnant 62 defines a fused tip 64 such that the tip region remnant 62 has the length L3.

The advantage of a fan blade configured to fail in a limited manner in response to catastrophic contact with the containment case is that the containment case may be built with less trench filler material or honeycomb. This is a result of the fact that the amount of force that can be imparted to the containment case by the blade is limited by the predetermined strength of the fracture walls. By failing quickly in a limited and predetermined manner, the remainder of the blade without the tip is likely to remain intact. The debris that is likely to contact other components is just a small amount released with the tip.

In summary, the illustrated embodiment is a metallic tip turbine blade that is designed to include a metallic material used as a blade tip to provide reduced stiffness of the blade tip relative to conventional blade tips. Whenever blade rub is significant enough to be categorized as an event, as in the case of an FBO, the blade pins and the tip fuses, i.e., fails. This eliminates the need for trench filler behind unbalance conditions. The tip region is made of a metallic material that has a low modulus of toughness relative to the material used four the body of the blade. The need for a fan case to be abradable is eliminated.

The foregoing has described an apparatus, i.e., a fan blade that includes a tip region that is configured to provide sufficient operating strength for normal operating conditions, and to fail when a predetermined load is applied to the tip of the blade. The tip region is configured to fail such that the tip of the blade quickly detaches from the remaining body of the blade. In this manner, the remaining tip region remnant and body of the blade remains intact and does not contact the containment structure.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not limited to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A blade for a propulsion apparatus, comprising:
a body formed of a first material having opposed pressure and suction sides, and extending in span between a root and a boundary, and extending in chord between a leading edge and a trailing edge;
a tip region that is formed of a second material and positioned such that it extends from the body and defines a tip;
wherein the tip region joins the body at the boundary;
wherein the tip region is configured to fail when a predetermined force is applied to the tip such that the tip folds across the body of the blade between the boundary and the tip and separates from the blade, the tip region configured to fail upon contact with an annular surface under heavy rub conditions, the tip region to remain intact under light rub conditions; and
wherein the blade is included in a plurality of blades positioned around a disk, the disk mounted in an engine by a support structure for rotation about a centerline axis of the engine, the support structure including at least one mechanical fuse configured to fail at a predetermined mechanical load, so as to permit the disk to rotate about the axis other than the centerline axis,
wherein the second material is weaker than the first material.

2. The blade according to claim 1, wherein the first material is titanium and the second material is aluminum.

3. The blade according to claim 2, wherein the blade is configured to include a tip region remnant that is formed of the second material after failure of the tip region.

4. The blade according to claim 3, wherein the tip region remnant defines a fused tip.

5. The blade according to claim 4, wherein the tip region has a second length L2 and the tip region remnant has a third length L3 and L3 is at least 5% of L2.

6. The blade according to claim 5, wherein the third length L3 is at least 25% of the second length L2.

7. The blade according to claim 6, wherein the third length L3 is at least 50% of the second length L2.

8. The blade according to claim 4, wherein the propulsion apparatus includes a shroud that surrounds the blade and the fused tip is spaced apart from the shroud.

9. The blade according to claim 1, wherein the boundary is positioned parallel to the chord of the body.

10. A propulsion apparatus, comprising:
a plurality of blades positioned around a rotatable disk, each blade including:
a body and a tip region that together define opposed pressure and suction sides, and extending in span between a root and a tip, and extending in chord between a leading edge and a trailing edge;
the tip region is attached to the body at a boundary and positioned such that the tip is spaced away from the boundary; and
wherein the body is formed of a first material and the tip region is formed of a second material and the second material is weaker than the first material;
wherein the tip region is configured to fail when a predetermined force is applied to the tip such that the tip folds across the body of the blade between the boundary and the tip and separates from a remainder of the tip region, the tip region configured to fail upon contact with an annular surface under heavy rub conditions, the tip region to remain intact under light rub conditions; and
a containment structure surrounding the rotatable disk and defining an annular inner surface that is spaced-away from the tips of the blades, the disk mounted in an engine by a support structure for rotation about a centerline axis of the engine, the support structure including at least one mechanical fuse configured to fail at a predetermined mechanical load, so as to permit the disk to rotate about the axis other than the centerline axis.

11. The apparatus according to claim 10, wherein the containment structure includes no trench filler material.

12. The apparatus according to claim 10, wherein the boundary is positioned parallel to the chord of the body.

13. The apparatus according to claim 10, wherein the tip region is configured to define a tip region remnant after application of the predetermined force.

14. A gas turbine engine apparatus, comprising:
a turbomachinery core;
a fan coupled in driven relationship with the turbomachinery core, the fan including:
a plurality of blades positioned around a disk, each blade including:
a body having opposed pressure and suction sides, and attached to a tip region such that they extend in span between a root and a tip that is defined by the tip region, and extend in chord between a leading edge and a trailing edge, wherein the body is formed of a first material and the tip region is formed of a second material, the second material weaker than the first material;
the tip region attached to the body at a boundary such that the tip is spaced-away from the boundary; and
wherein the tip region is configured to fail when a predetermined force is applied to the tip, such that the tip folds across the body of the blade between the boundary and the tip and separates from a remainder of the tip region such that a tip region remnant is defined, the tip region configured to fail upon contact with an annular surface under heavy rub conditions, the tip region to remain intact under light rub conditions;
wherein the disk is mounted in the engine by a support structure for rotation about a centerline axis of the engine, the support structure including at least one mechanical fuse configured to fail at a predetermined mechanical load, so as to permit the disk to rotate about the axis other than the centerline axis; and
a containment structure surrounding the disk and defining an annular inner surface that is spaced-away from the tips of the blades.

15. The apparatus according to claim 14, wherein the containment structure includes no trench filler material.

16. The apparatus according to claim 14, wherein the first material is titanium and the second material is aluminum.

17. The apparatus according to claim 14, wherein the body is formed of a metal.

18. The apparatus according to claim 14, wherein the tip region is configured to fail under heavy rub resulting from a large bird ingestion or a fan blade off event.

19. The apparatus according to claim 14, wherein the blade is manufactured using additive manufacturing, friction welding, or electrical discharge machining.

* * * * *